(12) United States Patent
Wang et al.

(10) Patent No.: US 7,475,367 B2
(45) Date of Patent: Jan. 6, 2009

(54) MEMORY POWER MODELS RELATED TO ACCESS INFORMATION AND METHODS THEREOF

(75) Inventors: Yaw-Feng Wang, Taipei (TW); Wen-Tsan Hsieh, Kaohsiung (TW); Yi-Fang Chiu, Hsinchu (TW); Sheng-Yu Hsu, Taipei (TW); Yeong-Jar Chang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 415 days.

(21) Appl. No.: 11/116,402

(22) Filed: Apr. 28, 2005

(65) Prior Publication Data
US 2006/0136793 A1    Jun. 22, 2006

(30) Foreign Application Priority Data
Dec. 17, 2004    (TW) .............................. 93139374 A

(51) Int. Cl.
*G06F 17/50* (2006.01)
(52) U.S. Cl. .............................................. 716/4; 716/5
(58) Field of Classification Search .................. None
See application file for complete search history.

(56) References Cited

U.S. PATENT DOCUMENTS

| | | | |
|---|---|---|---|
| 5,838,579 A | | 11/1998 | Olson et al. |
| 5,838,947 A | * | 11/1998 | Sarin .......................... 703/14 |
| 6,480,815 B1 | | 11/2002 | Olson et al. |
| 2003/0167460 A1 | * | 9/2003 | Desai et al. ................. 717/151 |

* cited by examiner

*Primary Examiner*—Leigh Marie Garbowski
(74) *Attorney, Agent, or Firm*—Birch, Stewart, Kolasch & Birch, LLP

(57) ABSTRACT

A power consumption model for a memory device is provided. According to each characteristic vector, a corresponding power lookup table is built. Each characteristic vector comprises an operating mode and a variation of the data and/or address status of the memory device.

9 Claims, 9 Drawing Sheets

```
...
pin(CLK) {
  ...
  internal_power(){
    when : "CEN";
     index_1 ("0.0 1.0");
    values ("0.000, 0.000")
  } internal_power(){
    when : "!CEN & WEN";
    index_1 ("0.0 1.0");
    values ("230.418, 230.418")
  } internal_power(){
    when : "!CEN & !WEN";
    index_1 ("0.0 1.0");
    values ("248.984, 248.984")
  }
}
...
...
```

302 — first internal_power block
304 — second internal_power block
306 — third internal_power block

FIG. 3 (RELATED ART)

Synchronous RAM - State Dependent Power Model
Example One

...
pin(CLK) {
direction : input;

402 —
```
internal_power( ) {
      when : "RAM_EN";
      power(input_by_trans) {
        values("0.5, 0.8, 1.6");
      }
}
```

404 —
```
internal_power( ) {
      when : "R_W * RAM_EN'";
      power(input_by_trans) {
        values("1.5, 2.5, 4.7");
      }
}
```

406 —
```
internal_power( ) {
when :   "R_W' & RAM_EN'";
      power(input_by_trans) {
      values("1.8, 2.8, 5.1");
      }
}
```
...

MEMORY POWER MODELS RELATED TO ACCESS INFORMATION AND METHODS THEREOF

BACKGROUND

The disclosure relates to the field of electronic design automation (EDA). More particularly, the disclosure relates to the field of power modeling used in EDA tools.

In integrated circuit (IC) design flow, designers use EDA tools to implement their ideas into a physical circuit. An ASIC design flow is shown in FIG. 1. Circuit designers can use EDA tools to start from behavior-level 102, to gate-level 104, then to transistor-level 106. In behavior-level 102, the idea is represented by Boolean functions. After synthesizing by EDA tool, the idea in behavior-level could turn into gate-level netlist. In gate-level 104, the netlist is represented by logic gates. After placement and routing, the gate-level netlist is converted to a transistor-level circuit. In transistor-level 106, the circuit is represented by transistors and the connections thereof.

Along with the design conversion from behavior-level to transistor-level, the EDA tools also estimate circuit performance at the behavior and gate-level, such as timing, area, power consumption, etc. Only when the estimated results at behavior-level 108 meets the design specification, can designers can move on to the next level. Similarly, designs are allowed to be operated in transistor-level process when the gate-level estimation can meet its design specification. Since the results 108 and 110 are only estimated results, the measured value 112 after physical implementation may not met the design specifications. If the measured value 112 at the transistor-level fails to meet the design specification or customer requirements, for example, the measured value 112 is too large on area, processing of a testbench is too time consuming, or too much power consumption, the designer must re-design the circuit from the behavior level stage. To reduce development time, designing a precise estimation tool is required aid in evaluating circuit performance at the behavior-level and gate-level.

FIG. 2 is a prototype of a random access memory (RAM) device 200 showing address port ADDR, data port DATA, write enable pin WEN, and chip enable pin CEN. When a RAM operates in idle modes, the chip enable pin CEN should be logic 1. When a RAM operates in a read mode, the chip enable pin CEN should be logic 0 and the write enable pin should be logic 1. As a RAM operates at write mode, the chip enable pin CEN and the write enable pin WEN should be logic 0.

FIG. 3 shows a TSMC 0.25μm Process SRAM Generator User Manual by Artisan (2002). In FIG. 3, the memory power model is built according to operating modes. The operating modes are idle mode 302, read mode 304, and write mode 306. The operating mode can be determined based on the WHEN statement. FIG. 4 shows a power model of a synchronous RAM from U.S. Pat. Nos. 5,838,579 and 6,480,815. In FIG. 4, the memory power model is also built by operating modes. The operating modes are idle mode 402, read mode 404, and write mode 406. The operating mode can be determined based on the WHEN statement.

An EDA tool can count the numbers of operating modes and lookup its corresponding power table to calculate the power consumption of a memory device. FIG. 5 shows an average current curve versus clock cycle. When a memory device operates at 10 MHZ, write mode 502 and read mode 504, the average difference in current is 100 μA. It seems reasonable to build the memory power models by operating modes. In fact, building a power model by just separating their operation modes are not precise enough, because even in the same operating mode may exist an un-neglect gap, for example, write mode 502, the current consumed varies from 640 μA to almost 730 μA. This implies that if the memory power model similar to that on FIG. 3 or FIG. 4 is used, the results of estimating power consumption would be too pessimistic or too optimistic.

SUMMARY

Methods for providing a power consumption model and machine readable memories storing a power consumption model are provided. An embodiment of the method for providing a power consumption model for a memory device comprising a plurality of pins, a first and a second group comprising at least one pin, respectively, and the two groups are mutually exclusive, the method comprising: defining a status of the first group; defining a status of the second group; defining a plurality of characteristic vectors, each characteristic vector comprising one status of the first group and one variation of the second group; providing an input pattern; executing the input pattern on a library cell representative of the memory device, and analyzing the characteristic vectors corresponding to the input pattern; defining a consumed power quantity of the memory device according to a characteristic vector; and defining a power consumption table according to the consumed power quantity.

An embodiment of the method for applying a power consumption model for a memory device comprising a plurality of pins, a first and second group comprising at least one pin, respectively, and the first and second groups are mutually exclusive, the method comprising: analyzing a plural status of the first group according to a input pattern; providing a dummy module, comprising: providing a library cell representative of the memory device; and providing a characteristic vector calculator to calculate plural characteristic vectors, wherein each characteristic vectors comprises a status of the first group and a status of the second group; executing the input pattern on the library cell; and looking up the power consumption model of the memory device according to the characteristic vectors and the dummy module.

An embodiment of the machine readable memory storing a power consumption model used for estimating power consumed by a memory device, the machine readable memory further comprising a program which drives a machine to execute the step of finding the corresponding power lookup table according to the operating mode of the memory device and a status of data and/or address ports.

In another aspect of the invention, the characteristic vector can be the statuses of the first and second group.

BRIEF DESCRIPTION OF THE DRAWINGS

The methods of providing the memory power model can be more fully understood by reading the subsequent detailed description and examples of embodiments thereof with reference made to the accompanying drawings, wherein:

FIG. 3 shows a TSMC 0.25 μm Process SRAM Generator User Manual by Artisan (2002);

FIG. 4 shows a power model of a synchronous RAM from U.S. Pat. Nos. 5,838,579 and 6,480,815;

DETAILED DESCRIPTION

In the following detailed description, reference is made to the accompanying drawings which form a part hereof, and in which is shown by way of illustration of specific embodiments. The following detailed description is, therefore, not to be taken in a limiting sense.

Figure 7:
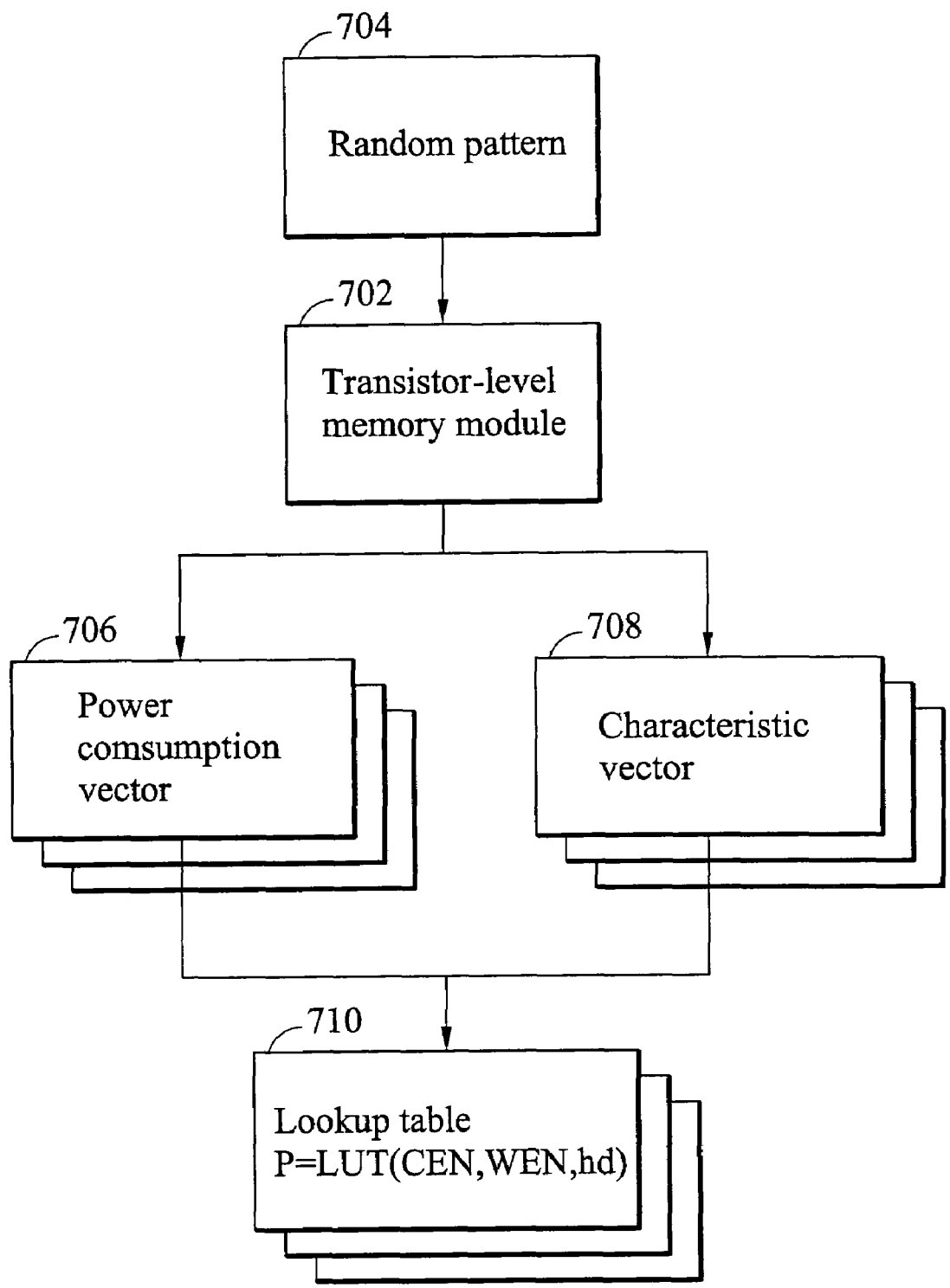
FIG. 7 shows a flow chart of generating a power model of a memory device.

FIG. 7 shows a flow chart of generating a power model of a memory device. A transistor-level memory module 702 is obtained from a memory compiler or by the user. A random pattern generator is used to generate the random patterns 704 to simulate various kinds of memory operating conditions. The random patterns 704 are transformed into the characteristic vector 708 sequences. A machine executes transistor-level simulation with those random patterns 704 to obtain the corresponding power consumption. Next, the memory power model, lookup table 710, is constructed by the power consumption vectors 706 and the corresponding characteristic vectors 708, such as write enable (WEN), chip enable (CEN), and Hamming distance (hd).

Each characteristic vector 708 comprises two parts: the operating mode status and the data/address variation status. The data/address variation status can be viewed as access information. In some embodiments of the invention, each characteristic vector 708 comprises the WEN, CEN and the Hamming Distance (hd) of access information. The hd of the access information is the variation of address/data status between previous clock cycle and present clock cycle. For instance, if the address status is 10001000 in a previous clock cycle and turns into 10000111 in a present clock cycle, there are 4 transitions have been occurred, thus the hd is 4.

Figure 1:
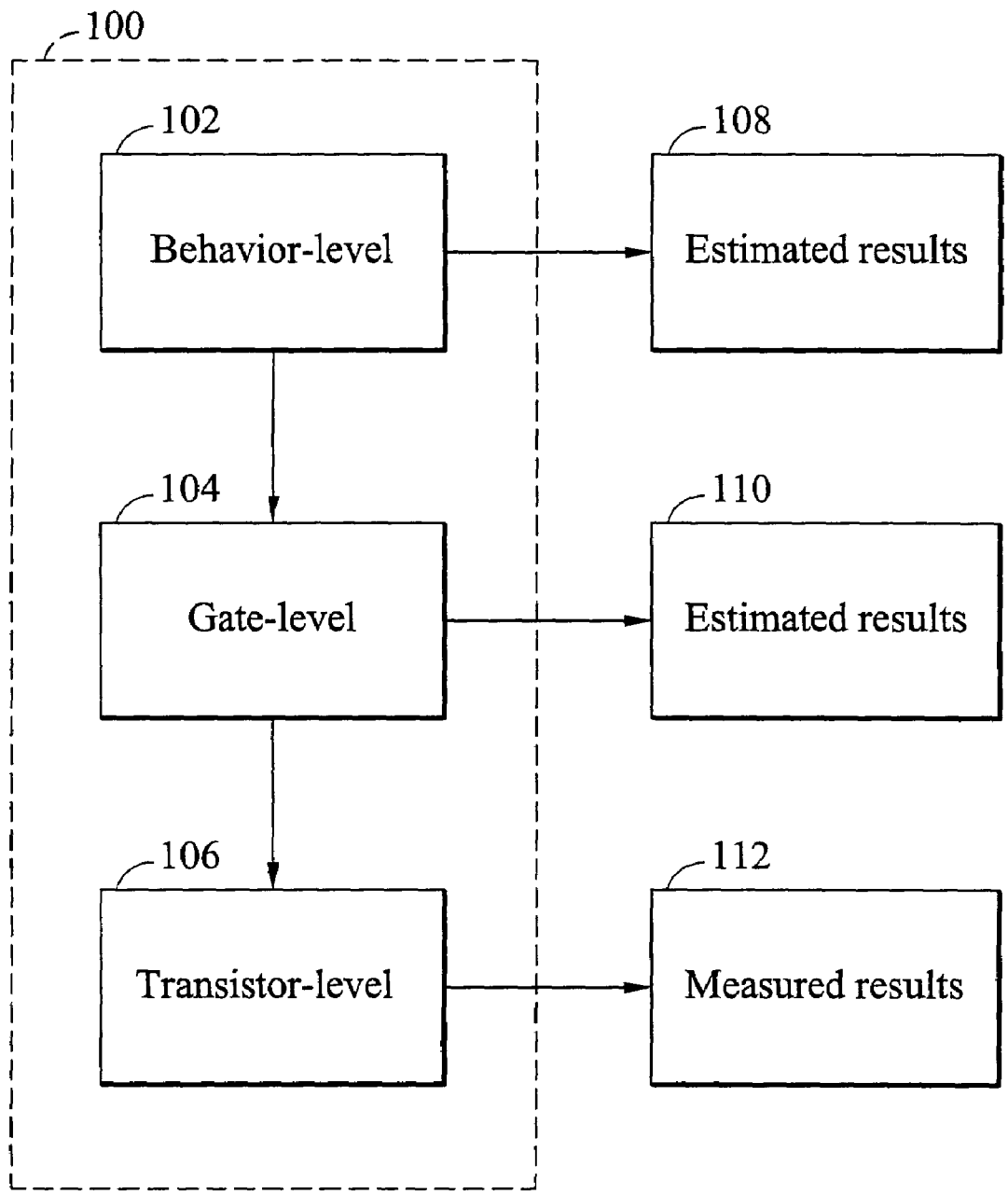
FIG. 1 shows an ASIC design flow.
Figure 2:
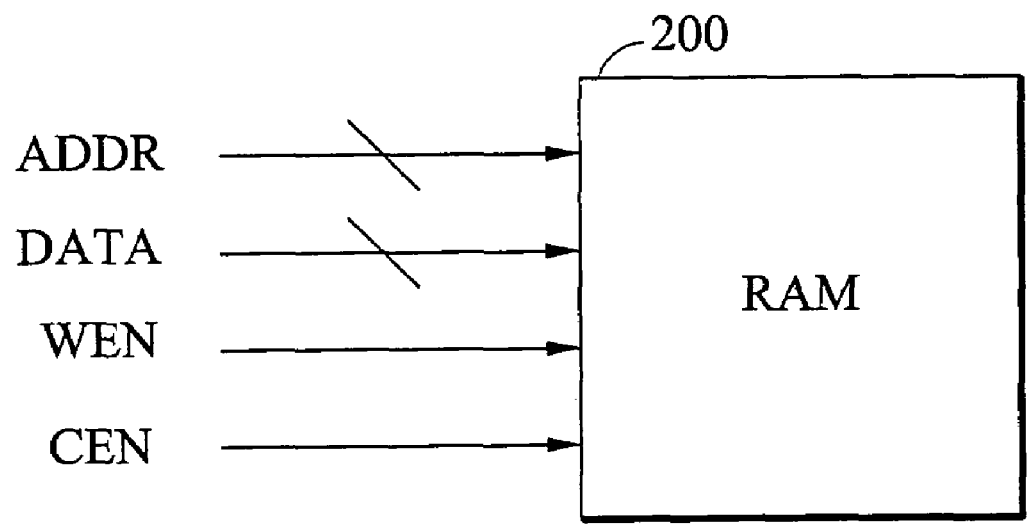
FIG. 2 is a prototype of a random access memory (RAM) device.
Figure 5:
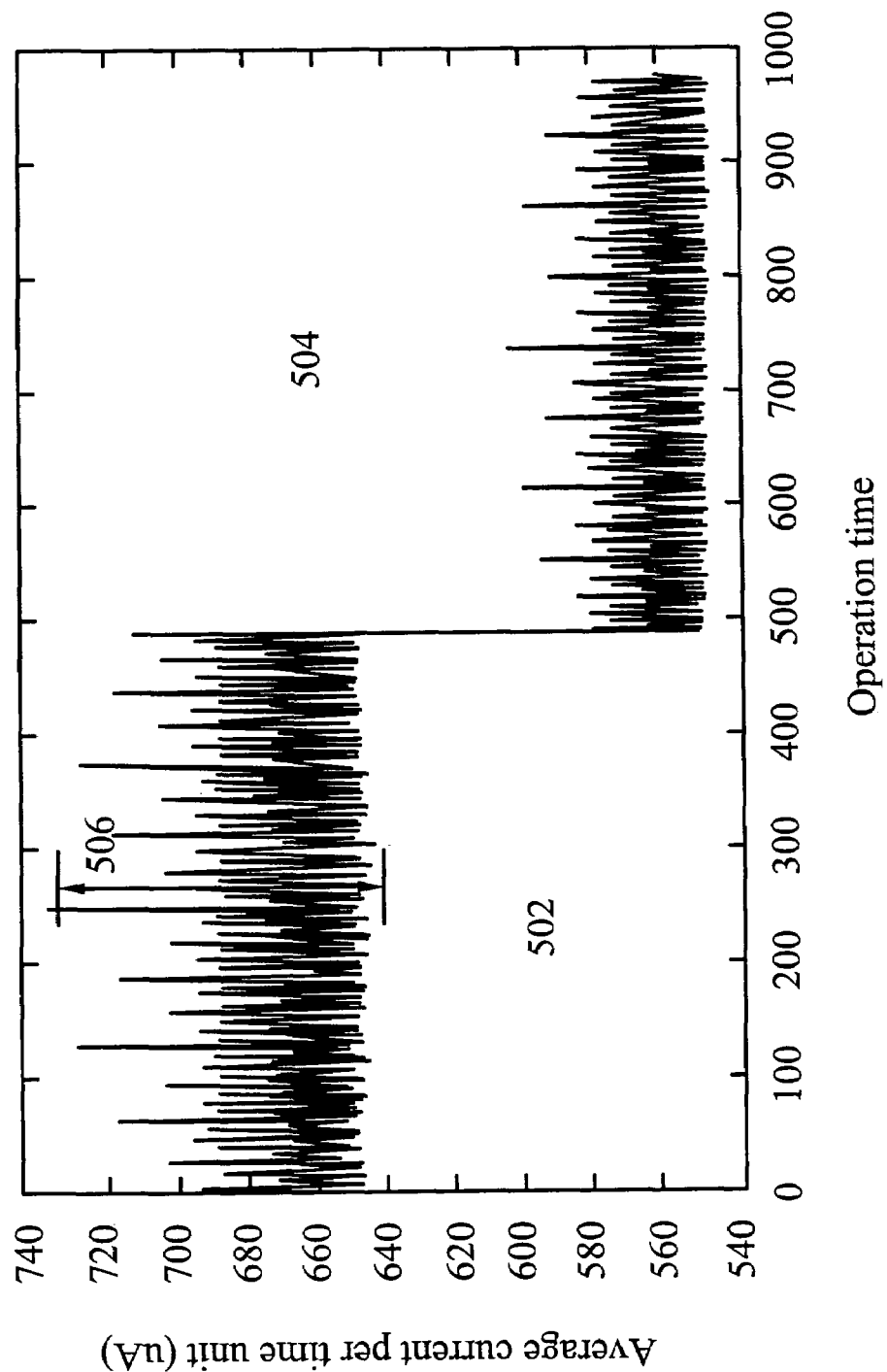
FIG. 5 shows an average current curve versus clock cycle when memory device is operated at 10 MHZ, write mode 502 and read mode 504, the average current difference 506 is 100 µA.
Figure 6:
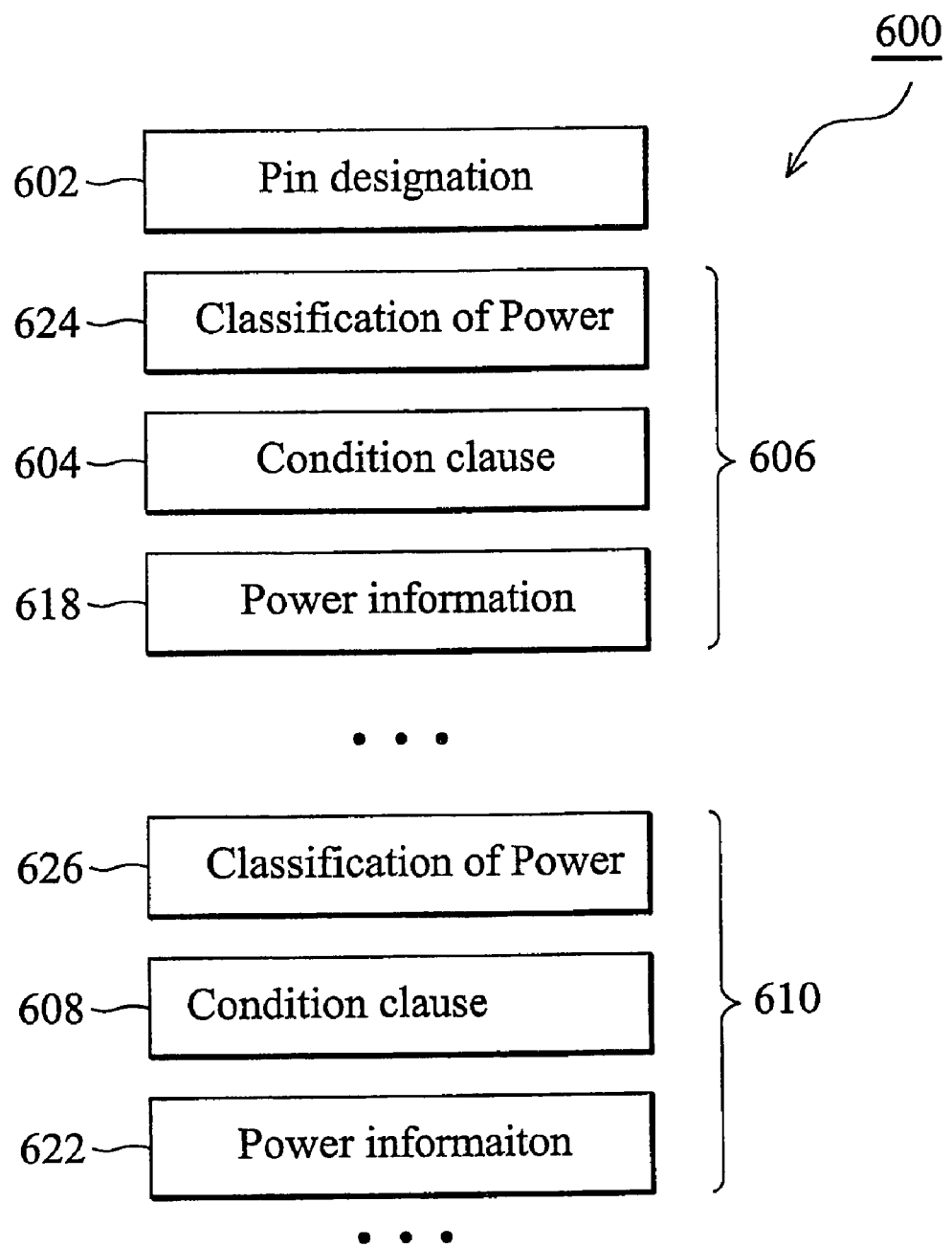
FIG. 6 illustrates a generic data structure 600 of the present invention representing power consumption within a memory device.

FIG. 6 illustrates a generic data structure 600 of the invention to represent power consumption within a memory device. Data structure 600 resides within a computer readable memory unit during power estimation (see FIG. 9). The data structure 600, as a program, performs a machine that lookup of a power consumption table based on a condition clause. For a designated pin of the memory device whose transition causes a power consumption event, the invention causes the machine to calculate the specific power consumed by the memory device. For each pin designation 602, the structure 600 of FIG. 6 contains one or more power classification 624 and 626 indicating that the power modeling information regarding the designated pin is to follow. Within each power group 606 and 610, the invention contains a condition clause 604 and 608, to state the operating condition for the designated pin, and power information, for performing machine to lookup while the condition clause is satisfied. In other words, during power analysis, if the statement at 604 is contemporaneously present with a transition at the pin identified by designation 602, the power information 618 is then used to determine the power consumed based on a given input signal transition time associated with the power event. The condition clause 604 typically contains a function of selected signals to represent the identified state. Structure 600 contains a second power group 610 for the designated pin, which contains the different condition clause 608 for the designated pin. If the designated pin is classified into a different classification of power 626, the consumed power would be searched in different power information 622 based on the condition clause 608. Although a number of different data structure can be used to implement the specifics of the generic outline of FIG. 6, one exemplary structure of the state dependent power modeling of the present invention is described in FIG. 8.

Figure 8:
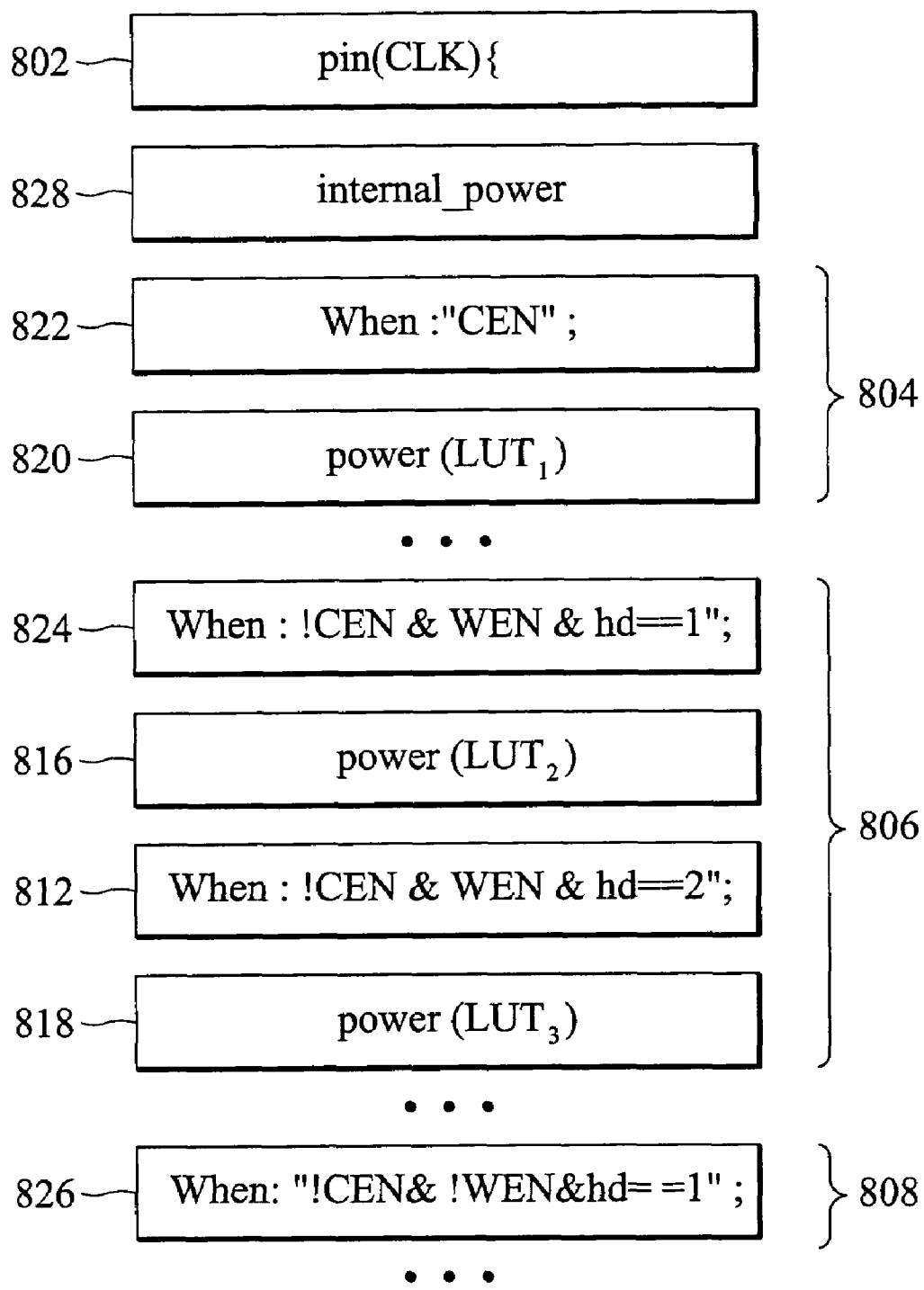
FIG. 8 shows an embodiment of the power model.

FIG. 8 shows an embodiment of the memory power model. For clock pin designation 802, the structure of FIG. 8 contains a classification of power, such as internal power 828. In FIG. 8, {WEN, CEN, hd} is a characteristic vector. EDA tool identifies the operating mode by states of CEN and WEN, and then finds a corresponding power consumption table by hd tag. The content of power consumption table can be obtained by the process is shown by FIG. 7. In idle mode 804, the accessed information has no effect on the power consumption table 820, hence, the condition clause 822 does not include hamming distance hd. When the condition statement 824 is satisfied, i.e., the memory device is in read mode 806 and the hamming distance of access information is 1, the EDA tool should then lookup the power consumption table 816. Similarly, when the condition statement 812 is satisfied, i.e., the memory device is in read mode 806 and the hamming distance of access information is 2, then the EDA tool should lookup the power consumption table 818. And in write mode 808, the consumed power is searched in a corresponding power consumption table based on the analysis of condition statement 826. In addition, thought single port SRAM is given as an example, those skilled in the art will recognize that the invention can apply to a multi-port, asynchronous memory device, etc.

Additionally, the characteristic vector can be formed by two other parts: the operating mode and the status of DATA and/or ADDR port. For instance, the characteristic vector is {WEN, CEN, abs}. The abs is the absolute value of DATA and/or ADDR port, or the number of 1 in the DATA and/or ADDR port. If the DATA and/or ADDR is 6-bit width, and the status of DATA and/or ADDR port is 001101, then the abs is 3. The corresponding power model and the process to build up the power model are similar with that mentioned above. Those skilled in the art can derive from the above description; hence, further detail is omitted herein.

Figure 9:
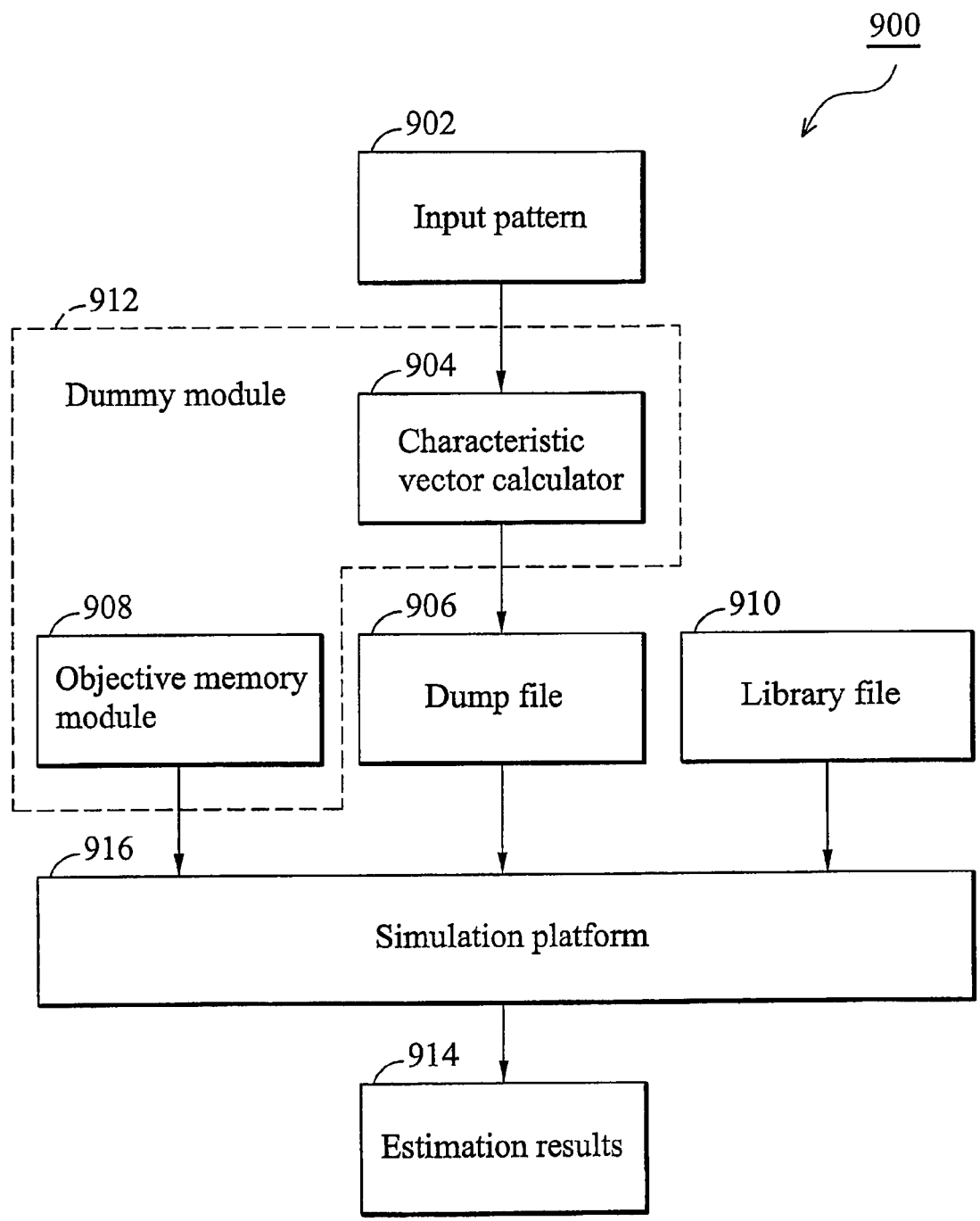
FIG. 9 illustrates an overall flow diagram 900 of steps and data files involved in a power estimation process in accordance with the present of the invention power modeling for an integrated circuit device.

FIG. 9 illustrates an overall flow diagram 900 of steps and data files involved in a power estimation process in accordance with the power modeling for an integrated circuit device. A simulation platform 916 is a machine to perform power estimation. The simulation platform 916 requires two files and one module: library file 910, dump file 906, and a dummy module 912. The library file 910 contains the power model structures of an objective library cell. The dump file 906 is generated by inserting an input pattern 902 to the characteristic vector calculator 904. The characteristic calculator 904 can generate characteristic information according to the input pattern 902. The dump file 906 includes operating modes and hamming distance of access information. In an embodiment of the invention, the characteristic calculator 904 and the objective memory module 908 is wrapped together to form the dummy module 912. Note that the power modeling process of the invention can be consistent with a commercial simulation tool.

To evaluate power consumption of a memory device, the times of each characteristic vector during the memory accessing must be detected. For example, assuming a memory device, called MEMCELL, has a particular power model defined when inputs WEN and CEN are all 0, and the hamming distance is 2 or 3 (e.g., state condition "!WEN & !CEN & hd=2" or "!WEN & !CEN & hd=3"), the power consumed by the MEMCELL is 5 and 8 units, respectively. In this case, the simulation platform has a record about a count value each time MEMCELL is under the condition of WEN and CEN being 0, and hd are 2 or 3. During simulation, this condition is monitored and a record is made each time it happens. In addition, the simulation platform records each occurrence of each condition outlined in the input pattern and the totals are summed over the simulation interval. For instance, the duration of condition (WEN=0 & CEN=0 & hd is 2) happened is 2 time units, and the duration of condition (WEN=0 & CEN=0 & hd is 3) is 6, the total power consumed is 2*5+6*8=58 units.

The following table shows a result of applying the power model of the invention. The memory module used is a High-Density Synchronous Single-Port SRAM provided by TSMC 0.25 μm memory compiler. The address (ADDR) port is 12-bit width, and the data (DATA) port is 14-bit width. The supply voltage (VDD) is 2.5V and the operation frequency is 1.0 MHZ.

| Input pattern | Up/down continuous sequence | LFSR Sequence Address |
|---|---|---|
| MAX. estimated power error(%) | 3.076 | 2.913 |
| Avg. estimated power error(%) | 2.091 | 1.693 |
| Std (%) | 0.402 | 0.106 |

The estimated power is compared with measured transistor-level results. The maximum estimated power is 3.076%, and the standard deviation is kept below 0.5%. The results show the memory power model of the invention performs very precisely.

Although the present invention has been described in preferred embodiment, it is not intended to limit the invention thereto. Those skilled in this technology can still make various alterations and modifications without departing from the scope and spirit of this invention. Therefore, the scope of the present invention shall be defined and protected by the following claims and their equivalents.

What is claimed is:

1. A method for providing a power consumption model for a memory device comprising a plurality of pins, a first and a second group comprising at least one pin, respectively, and the two groups are mutually exclusive, the method comprising:
   defining a status of the first group;
   defining a status of the second group, wherein defining the status of the second group is defining a variation of the second group, and defining the variation of the second group comprises:
      recording the status of the second group;
      calculating hamming distance of the second group when any pin of the second group changes status; and
      defining a variation, according to the hamming distance;
   defining a plurality of characteristic vectors, each characteristic vector comprising one status of the first group and one variation of the second group;
   providing an input pattern;
   executing the input pattern on a library cell representative of the memory device, and
   analyzing the characteristic vectors corresponding to the input pattern;
   defining a consumed power quantity of the memory device according to a characteristic vector; and
   defining a power consumption table according to the consumed power quantity.

2. The method as claimed in claim 1, wherein defining the status of the first group is defining a logic state of the first group.

3. The method as claimed in claim 1, wherein providing the input pattern provides a random sequence.

4. The method as claimed in claim 1, wherein executing the input pattern on the library cell representative of the memory device executes the input pattern on a transistor-level library cell representative of the memory device.

5. The method as claimed in claim 1, wherein the memory device comprises at least one data pin and one address pin, and the second group comprises at least one data pin or one address pin.

6. A method for applying a power consumption model for a memory device comprising a plurality of pins, a first and second group comprising at least one pin, respectively, and the first and second groups are mutually exclusive, the method comprising:
   analyzing a plural status of the first group according to a input pattern;
   providing a dummy module, comprising:
      providing a library cell representative of the memory device; and
      providing a characteristic vector calculator to calculate plural characteristic vectors, wherein each characteristic vectors comprises a status of the first group and a variation of the second group;
   executing the input pattern on the library cell; and
   looking up consumed power in the corresponding power consumption model of the memory device according to the characteristic vectors calculated by the dummy modules,
   wherein the characteristic vector calculator calculates the variation of the second group comprising the steps of:
      recording the status of the second group;
      calculating the hamming distance of the second group when any pin of the second group changes its status; and
      defining a variation according to the hamming distance.

7. The method as claimed in claim 6, further comprising analyzing a plural status of the second group according to an input pattern, and the characteristic vectors comprising a logic state of the first group and a variation of the second group.

8. The method as claimed in claim 6, wherein the memory device comprises at least one data pin and one address pin, and the second group comprises at least one data pin or one address pin.

9. A machine readable memory storing a power consumption model used for estimating power consumed by a memory device, the machine readable memory further comprising a program which drives a machine to execute the step of finding the corresponding power lookup table according to the operating mode of the memory device and a variation of data and/or address ports,
   wherein the variation of data and/or address ports is the hamming distance of the data and/or address ports.

* * * * *